United States Patent
Sato et al.

(10) Patent No.: US 6,883,232 B2
(45) Date of Patent: Apr. 26, 2005

(54) APPARATUS FOR FINISHING STRIPPED END OF SHIELD WIRE

(75) Inventors: Takahiko Sato, Shizuoka (JP); Hirokazu Kobayashi, Shizuoka (JP); Mitsunori Yoshida, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 359 days.

(21) Appl. No.: 09/985,541

(22) Filed: Nov. 5, 2001

(65) Prior Publication Data

US 2002/0050062 A1 May 2, 2002

(30) Foreign Application Priority Data

Nov. 6, 2000 (JP) .......................................... 2000-337414

(51) Int. Cl.$^7$ .............................................. H01R 43/00
(52) U.S. Cl. ........................... 29/867; 29/33 F; 29/865; 29/857; 29/748; 29/759
(58) Field of Search .............................. 29/33 F, 33 M, 29/867, 865, 857, 745, 747, 748, 749, 750, 757, 759

(56) References Cited

U.S. PATENT DOCUMENTS

| | | | | |
|---|---|---|---|---|
| 3,484,922 A | * | 12/1969 | Schwalm et al. | 29/566.2 |
| 3,590,481 A | * | 7/1971 | Felty et al. | 29/828 |
| 3,721,138 A | * | 3/1973 | Kamimura et al. | 81/9.51 |
| 4,059,330 A | * | 11/1977 | Shirey | 439/578 |
| 4,600,263 A | * | 7/1986 | DeChamp et al. | 439/585 |
| 4,719,697 A | * | 1/1988 | Schwartzman et al. | 29/867 |
| 4,914,986 A | * | 4/1990 | Masaki | 81/9.51 |
| 5,269,206 A | * | 12/1993 | Yagawa | 81/9.51 |
| 6,363,604 B1 | * | 4/2002 | Sakuma | 29/566.1 |
| 6,659,140 B2 | * | 12/2003 | Yamakawa | 140/71 R |

FOREIGN PATENT DOCUMENTS

JP          10-92521          4/1998

* cited by examiner

*Primary Examiner*—Richard Chang
(74) *Attorney, Agent, or Firm*—Armstrong, Kratz, Quintos, Hanson & Brooks, LLP

(57) ABSTRACT

An outer sheath of a shield wire is stripped by a predetermined length from an end of the shield wire to expose a knitted layer of the shield wire. A shield stopper is mated over the exposed knitted layer until the shield stopper abuts against a stripped end of the outer sheath. A metal shell piece is preparatorily mated over an inner sheath of the shield wire while the metal shell piece expands the knitted layer. The shield stopper is clamped by a clamp means, and the mated metal shell piece is pushed to engage with the shield stopper. In the engagement state, the shield stopper overlaps a forward end portion of the metal shell with the knitted layer therebetween. A first cutter is guided by a pipe member so that the first cutter engages with an outer peripheral surface of the second cutter. Thereby, the shearing movement of the cutters cuts the exposed knitted layer near a rear end of the shield stopper.

6 Claims, 6 Drawing Sheets

(FIGS. 7A TO 7E ARE CONVENTIONAL ARTS)

APPARATUS FOR FINISHING STRIPPED END OF SHIELD WIRE

BACKGROUND OF THE INVENTION

1. Field of the Invention

The present invention relates to a finishing method and an apparatus thereof for cutting a knitted layer of an end portion of a shield wire to automatically fit a shield stopper and a metal shell to the end potion.

2. Related Art

Recently, electric motor vehicles have been developed in view of nature conservation and environmental pollution problems. Such electric motor vehicles employ high voltage cables connected to a battery or a generator. The cable is a shield wire of which an end is finished as mentioned below. That is, as illustrated in FIGS. 7A to 7B, an outer sheath A of the shield wire is manually cut off by a predetermined length L from a cut end B to expose a knitted layer C. Over the exposed shied wire, a shield stopper D of a metal conductor is mated to abut against an end surface of the outer sheath A (FIG. 7B). Then, a pair of scissors E cut off an unnecessary portion of the exposed knitted layer C at an end of the shield stopper D (FIG. 7D). Next, a metal shell F of a metal conductor is forcedly inserted inside the knitted layer C along an inner sheath G of the wire by using a jig. A reduced diameter portion H of the shield stopper D crimps the metal shell F with the knitted layer C therebetween to finish the end portion of the shield wire (FIG. 7E).

However, the manual cutting of the knitted layer C causes an incompletely cut portion of the knitted layer C at the stage of FIG. 7D, causing variations in cutting quality thereof. The uncut portion consists of some strings of the knitted layer. Thus, after the insertion of the metal shell F, the pair of scissors E need to be used again for cutting the remained portion. Furthermore, the pair of scissors E having sharp edges may causes a damage to the shield stopper D, the metal shell F, or the inner sheath G insulating a core wire. Moreover, it disadvantageously takes a longer working time to handle the shield wire since the shield wire is long.

SUMMARY OF THE INVENTION

In view of the above-mentioned disadvantages, an object of the present invention is to provide a finishing method and an apparatus of a shield wire to improve insulation of an end of the shield wire and to finish the wire end with an efficient workability.

For achieving the object, a method for finishing a shield wire according to the present invention includes the steps of:

stripping an outer sheath of a shield wire by a predetermined length from an end of the shield wire to expose a knitted layer of the shield wire;

mating a shield stopper with the shield wire over the exposed knitted layer until the shield stopper abuts against a stripped end of the outer sheath;

preparatorily mating a metal shell piece with the shield wire over an inner sheath of the shield wire while the metal shell piece expands the knitted layer;

clamping the shield stopper by a clamp means;

pushing the preparatorily mated metal shell piece to abut against the shield stopper; and cutting the exposed knitted layer near the abutment position of the shield stopper and the metal shell by a shearing operation of a first cutter and a second cutter.

Thus, the shield stopper is mated over the outer sheath to abut against a stripped end of the outer sheath. Then, the metal shell is mated over the inner sheath. Next, the shield stopper is pinched by the clamp means, and the metal shell is pushed to abut against the shield stopper. The pushing of the metal shell causes the first and second cutters to cut the knitted layer by a shearing movement of the cutters at a rear end of the shield stopper. This completely cuts the knitted layer to efficiently finish the stripped end portion of the shield wire.

Furthermore, an apparatus according to the present invention for finishing a shield wire of which an outer sheath is preliminarily stripped by a predetermined length from an end of the shield wire to expose a knitted layer of the shield wire includes:

a shield stopper mated with the shield wire over the exposed knitted layer until the shield stopper abuts against a stripped end of the outer sheath, a metal shell piece mated with the shield wire over an inner sheath of the shield wire while the metal shell piece expands the knitted layer, a clamp means for clamping the shield stopper, a push means for pushing the inserted metal shell piece to abut against the shield stopper, and a first cutter and a second cutter for shearing the exposed knitted layer while the first cutter moves along the push means.

Thus, the clamp means holds the shield wire, and the pushing means pushes the metal shell to abut it against the shield stopper. The pushing means guides the first cutter which surely cuts the exposed knitted layer in cooperation with the second cutter. A sequential automatic operation is enabled to push the metal shell inside the knitted layer and to cut off the unnecessary knitted layer.

Preferably, the clamp means is a pair of clamp blocks for pinching the shield wire therebetween. Thus, the clamp means consisting of the pair of clamp blocks stably holds the shield wire and accurately positions it, allowing a sure insertion of the metal shell and a correct cutting operation of the knitted layer.

Preferably, the push means is a pipe member mated over the inner sheath and is movable relative to a support body opposed to the clamp means. Thus, the pushing means is fitted on the support body moving toward the clamp means and is the pipe member which can be mated over the inner sheath. Thereby, a forward end of the pipe member abuts against the metal shell while the metal shell moves forward inside the knitted layer.

Preferably, the first cutter is opposed to the clamp means and guides the pipe member to move relative to the support body, and the second cutter is mounted on the pair of clamp blocks opposed to the first cutter. Thus, the first cutter opposed to the clamp means also serves to guide the pipe member, so that the pipe member can move accurately toward the pair of clamp blocks. Thereby, the pipe member allows a smooth insertion of the metal shell.

Preferably, the first cutter has a cross sectional area gradually decreasing toward the clamp means. Thus, the movement of the first cutter toward the clamp means expands the exposed knitted layer, enabling an easy shearing operation for the knitted layer.

Preferably, the support body is movable relative to the clamp means. Thus, the support body is movable toward the clamp means while the metal shell is abutting against the pipe member of the pushing means. Thereby, the first cutter moves inside the knitted layer. This enables to automatically cut the knitted layer.

Preferably, the first cutter mounted on the support body is guided by the pipe member while the pipe member pushes the metal shell toward the shield stopper, so that the first cutter moves to engage with an outer periphery of the second cutter to thereby cut the knitted layer. Thus, during the movement of the support body toward the clamp block, the first cutter is guided by the pipe member so that the first cutter engages with an outer peripheral surface of the second cutter. Thereby, the shearing movement of the cutters cuts the exposed knitted layer at the rear end of the shield stopper. This enables to completely cut the knitted layer to remain no unnecessary part thereof.

Preferably, the metal shell is inserted into the shield stopper with the knitted layer therebetween. Thus, the shield stopper partially overlies over the metal shell with the knitted layer therebetween, allowing an easy crimping of the metal shell.

Preferably, the shield stopper crimps the metal shell and the knitted layer by the insertion of the metal shell into the shield stopper. Thus, the overlapped portion firmly crimps the knitted layer and the metal shell by the shield stopper, allowing a reliable electrical connection thereof.

DETAILED DESCRIPTION OF THE PREFERRED EMBODIMENTS

Figure 1:
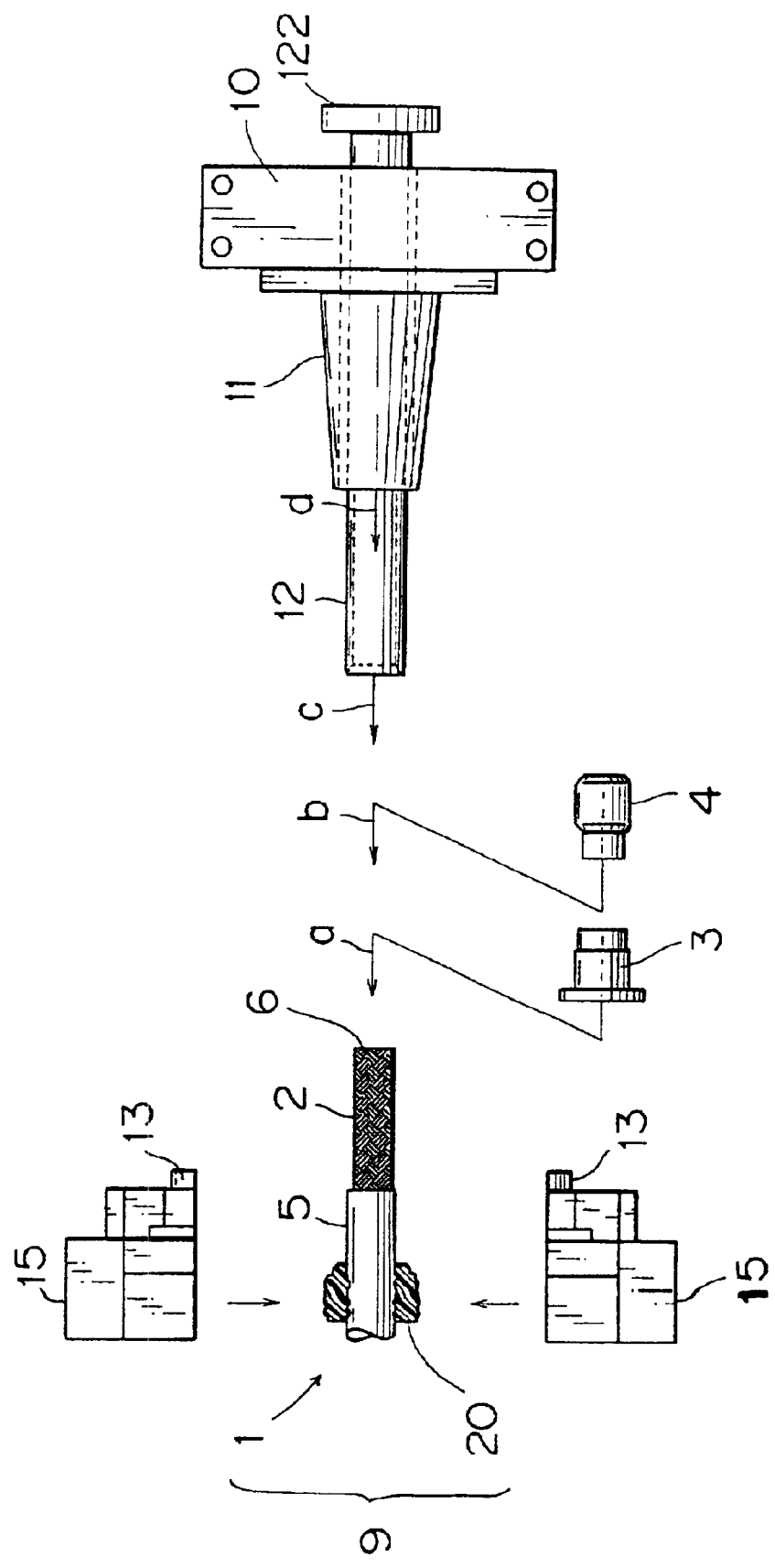
FIG. 1 is a general illustration showing a step of a shield wire finishing method of an embodiment according to the present invention.
Figure 2:
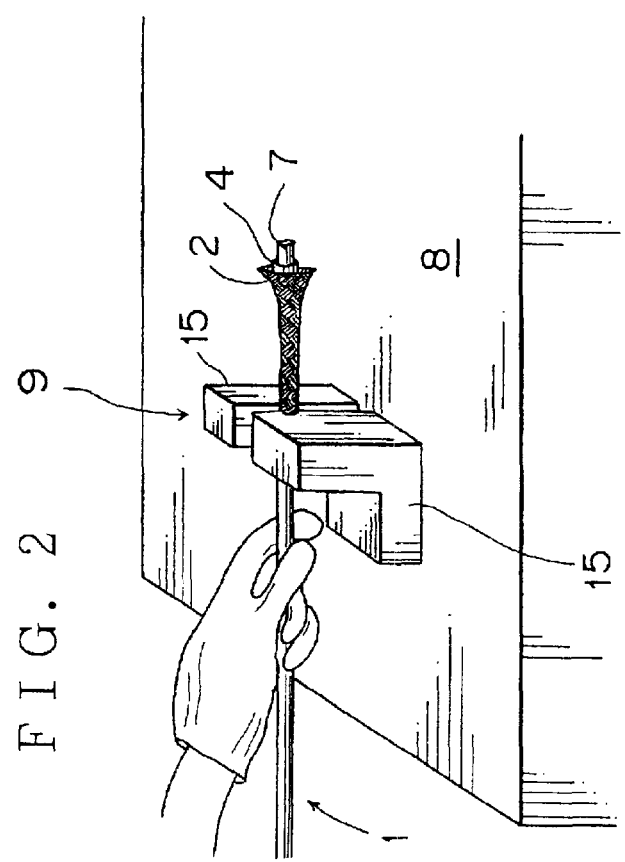
FIG. 2 is a perspective view showing a state in which a shield wire is held by a clamp means of FIG. 1.
Figure 3:
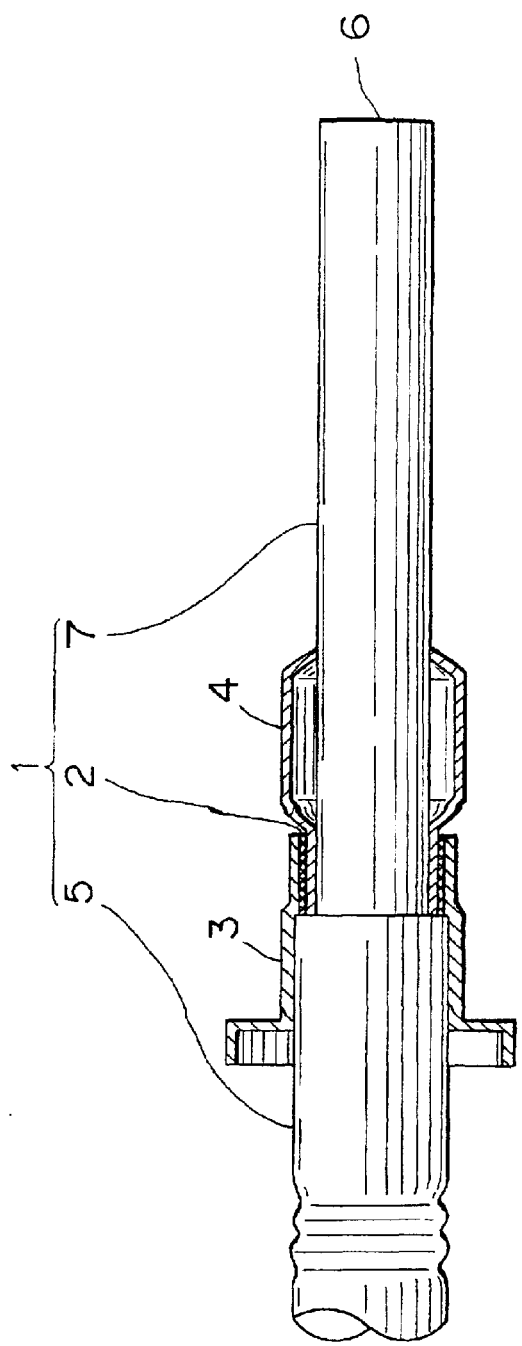
FIG. 3 is a sectional view showing the shield wire having a finished end.
Figure 4:
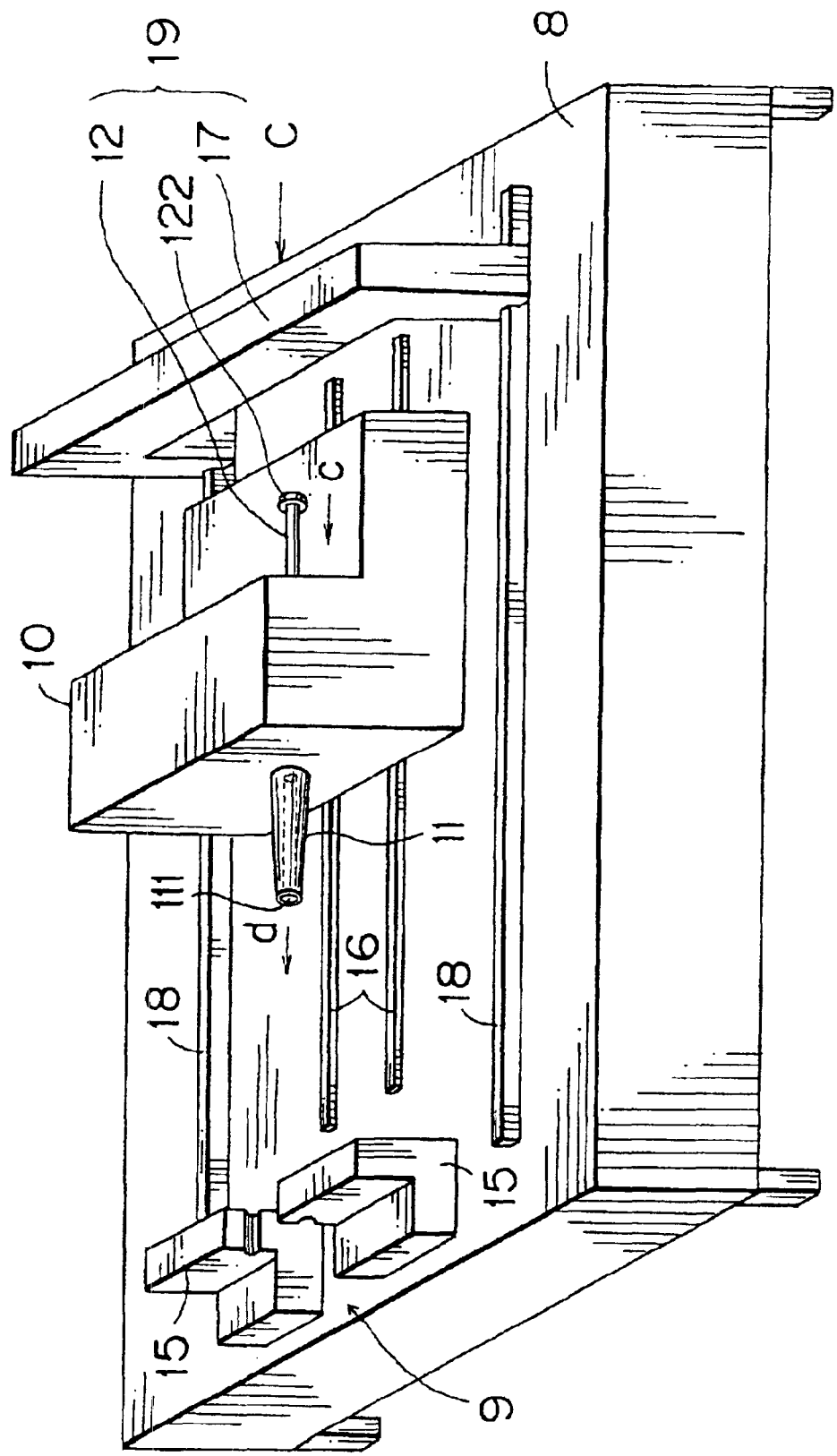
FIG. 4 is a general perspective view showing a shield wire finishing apparatus of an embodiment according to the present invention.

Referring to FIGS. 1 to 3, an embodiment of a method for finishing a shield wire according to the present invention will be discussed in detail.

As illustrated in FIG. 3, a shield wire 1 is finished at an end thereof. The finished end is crimped by a shield stopper 3, while a knitted layer 2 of the shield wire 1 is pinched between a metal shell 4 and the shield stopper 3. First, as illustrated in FIG. 1, an outer sheath 5 of the shield wire 1 is stripped by a predetermined length from a cut end 6 of the wire to expose the knitted layer 2. Over the knitted layer 2, the shield stopper 3 is mated till the shield stopper 3 abuts against a stripped end of the outer sheath 5 in a direction a. Next, as illustrated in FIG. 2, an end portion of the exposed knitted layer 2 is expanded, and the metal shell 4 is mated over the inner sheath 7 in a direction b. Then, a clamp means 9 pinches the shield wire on a work table 8 by a manual operation.

Reference numeral 10 designates a support body described later in detail and disposed on the table 8. The support body 10 is fitted with a first cutter 11. Through the support body 10 and the first cutter 11, a metal shell forwarding piece 12(a metal shell pushing means described later)of a pipe piece is provided to move longitudinally. The metal shell forwarding piece 12 moves relative to the support body 10 and the first cutter 11 in a direction c to be in a state of FIG. 5. A further forward movement of the metal shell 4 pushes itself till the metal shell 4 abuts against a rear end of the shield stopper 3 to be in a state of FIG. 6. The metal shell 4 has an outer diameter D1 substantially equal to an outer diameter D2 of a second cutter 13. The second cutter 13 is a cutting blade provided at an end of the clamp means 9. Thereby, the first cutter 11 can move forward to allow a smooth shearing operation of the first and second cutters.

The first cutter 11 is guided by the metal shell forwarding piece 12 to move together with the support body 10 in a direction d while the metal shell forwarding piece 12 is pushing the metal shell 4. Each of the outer diameters D1, D2 is substantially equal to an inner diameter D3 of the first cutter 11 such that the first cutter 11 slides on outer surfaces of the metal shell 4 and the second cutter 13. Thereby, an unnecessary exposed portion of the knitted layer is cut by a shearing operation of the first and second cutters 11,13 as illustrated in FIG. 3.

The shield stopper 3 crimps an overlapping portion of the knitted layer 2 and the metal shell 4, allowing a sure electrical connection thereof. Thus, the end portion of the shield wire is appropriately finished.

Next, a finishing apparatus to carry out the finishing method will be discussed. The clamp means 9 is disposed on the table 8 consists of a pair of the clamp blocks 15. Toward the clamp means 9, the support body 10 moves longitudinally on a pair of rails 16 in the direction d. Through the support body 10 and the first cutter 11, there is provided the metal shell forwarding piece 12 of a pipe shape which passes the shield wire 1 therethrough.

Reference numeral 17 designates a metal shell pushing block moving on a pair of rails 18 in the direction d. The metal shell pushing block 17 pushes a rear end head 122 of the metal shell forwarding piece 12 in the direction c. Thereby, the metal shell forwarding piece 12 moves through a hole 101 formed in the support body 10 and another hole 111 formed in the first cutter 11. Thus, the metal shell pushing block 17 composes the metal shell pushing means 19 together with the metal shell forwarding piece 12.

The clamp block 15, support body 10, and metal shell pushing block 17 are actuated, for example, by an air cylinder device (not shown) and the device is assisted by a numerical control system.

Figure 6:
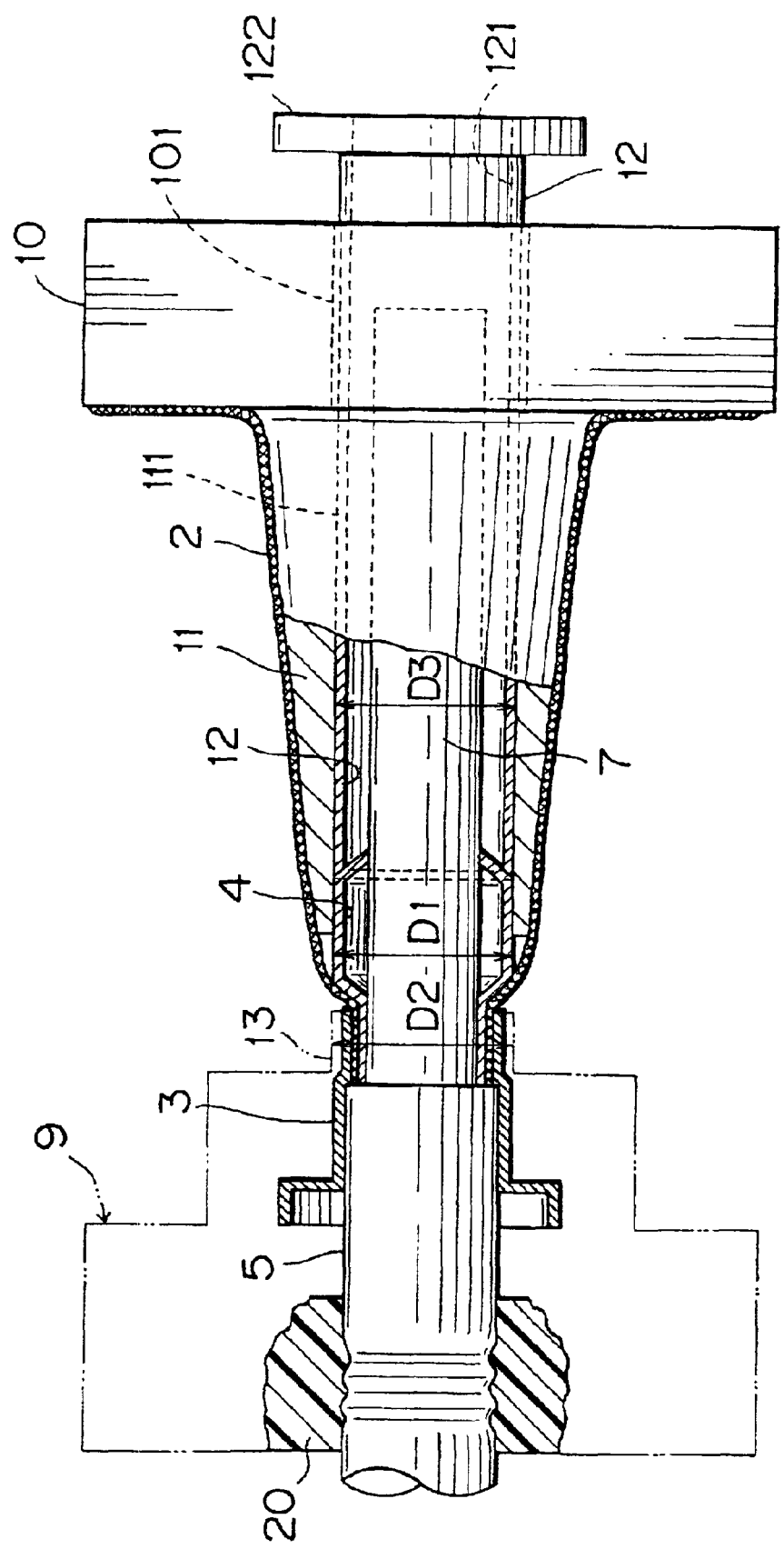
FIG. 6 is a sectional view showing a state in which first and second cutters shear a knitted layer.
Figure 7A:
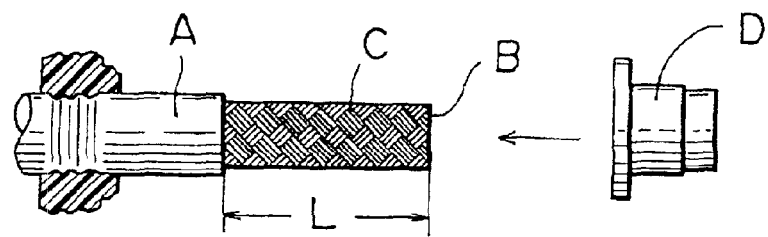
FIGS. 7A and 7E are sectional views illustrating steps of a conventional finishing method for a shield wire, which sequentially show a mating step of a shield stopper, a longitudinal cutting step of a knitted layer by a pair of scissors, a lateral cutting step of the knitted layer, a push-in step of a metal shell, and a final step for finishing the shield wire.
Figure 7B:
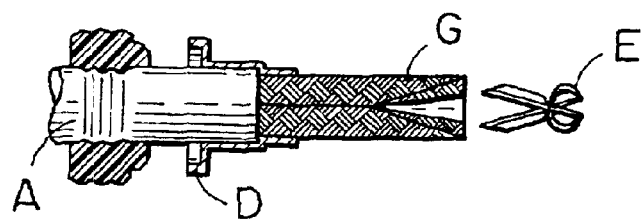
Figure 7C:
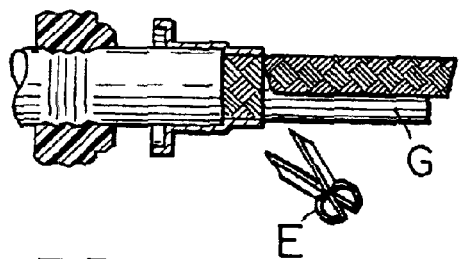
Figure 7D:
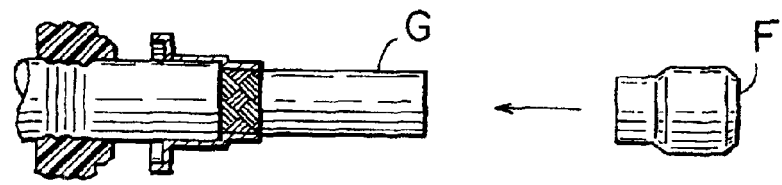
Figure 7E:
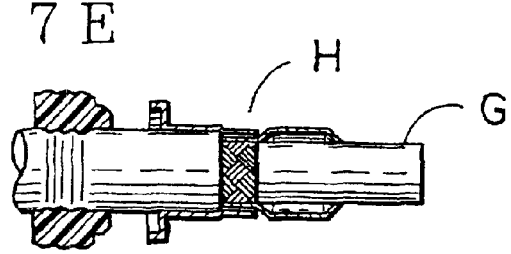

The first cutter 11 has an outer conic shape to expand the knitted layer 2 for an easy insertion of the first cutter 11 when the support body 10 moves longitudinally. As illustrated in FIG. 6, the first cutter 11 slides on an outer surface of the metal shell 4, and the support body 10 moves in the direction d. Thereby, a leading end of the first cutter 11 slidingly engages with an outer surface (for example, a cylindrical surface) of the second cutter 13 provided on an end of the clamp block 15. Thus, the first cutter 11 slides over the second cutter 13 to thereby shear an unnecessary portion of the knitted layer 2 located between both the cutters 11,13 (see FIG. 6).

The shield wire 1 held by the clamp means 9, the metal shell forwarding piece 12, the first cutter 11, and the second cutter 13 have central axes all of which align longitudinally with each other.

Reference numeral 20 designates a spacer made of a soft resin material (for example, a rubber) disposed between the clamp block 15 and the shield wire 1. The spacer holds the shield wire 1 with a friction force thereof. The shield wire 1 which has been held by the clamp block 15 has a central axis substantially aligning with that of the metal shell forwarding piece 12.

The diameters of the metal shell 4, the second cutter 13, the metal shell forwarding piece 12, and the first cutter 11 are determined as discussed in the finishing method of the shield wire 1.

Operations of the embodiment of the finishing apparatus will be discussed below.

Figure 5:
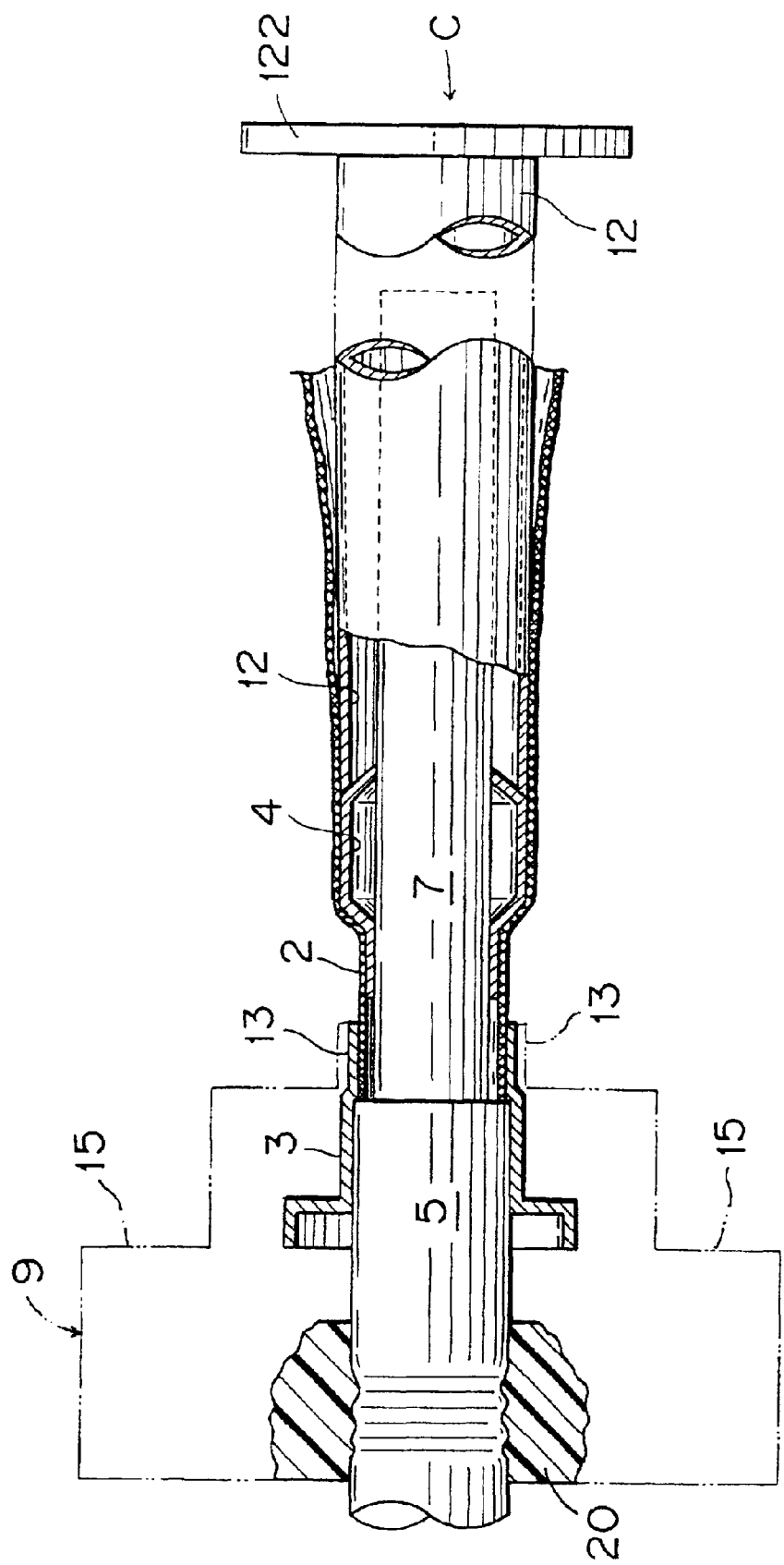
FIG. 5 is a sectional view showing a state in which a metal shell is pushed by a metal shell forwarding piece.

As illustrated in FIG. 2, the shield stopper 3 is mated over the knitted layer 2 of the shield wire 1 till the shield stopper 3 abuts against the stripped end of the shield wire 1 (FIG. 5). The knitted layer 2 is expanded to insert the metal shell 4 under the knitted layer 2 (FIG. 2). The shield wire 1 is pinched by the clamp blocks 15 to be secured thereto (FIG. 5). The metal shell pushing piece 12 is moved in the direction c by the metal shell pushing block 17 while the support body 10 stands still (FIG. 5). The metal shell 4 is pushed by the forward end of the metal shell pushing piece 12 to move forward inside the knitted layer 2 till the metal shell 4 abuts against the outer sheath 5. A portion of the knitted layer 2, which is positioned in a side of the clamp block 15, is crimped between the metal shell 4 and the shield stopper 3.

While the metal shell pushing piece 12 is pushing the metal shell 4, the support body 10 is moved in the direction d on the rails 16. Thereby, the first cutter 11 moves in the direction d along the metal shell pushing piece 12, while the first cutter 12 expands the knitted layer 2. As illustrated in FIG. 6, the outer sheath stripped portion of the wire is received in a hole 121 of the metal shell pushing piece 12. A further forward movement of the support body 10 causes the first cutter 11 to outwardly engage with the second cutter 13. This cuts the knitted layer 2 near the metal shell 4 by shearing movements of the cutters.

After the cutting, the support body 10 moves backward oppositely to the direction d, and the metal shell forwarding piece 12 engages with the head 122. Thereby, the support body 10 and the metal shell forwarding piece 12 unitarily moves apart from the shield wire 1. Then, the clamp blocks 15 are opened to release the shield wire 1. The overlap portion of the shield wire 1 crimps the shield stopper 3, the knitted layer 2, and the metal shell 4, enabling a sure mechanical and electrical connection thereof.

The finishing apparatus can finish an end portion of the shield wire 1 as discussed above.

In the finishing method and apparatus of the embodiment, the shearing movement of the first cutter 11 and the second cutter 13 cuts the knitted layer 2 to provide a stable cutting quality. Unlike the conventional art, the knitted layer 2 can be cut without using a pair of scissors. This causes no damage to the shield wire 1 to maintain a reliable electrical performance of the product.

In the embodiment of the finishing apparatus, a sequential automatic operation is enabled to push the metal shell 4 inside the knitted layer 2 and to cut off the unnecessary knitted layer 2. This improves the finishing process in workability together with a reliable quality of the products.

Furthermore, regardless of the length of the shield wire 1, the unnecessary knitted layer can be cut off, and a time required for finishing the shield wire 1 is constant.

Note that the embodiment does not intend to limit the present invention, and any modification of the embodiment in design may be possibly within a scope of the present invention.

For example, the outer diameter D2 of the second cutter 13 may be a little larger than the outer diameter D1 of the metal shell 4, although D2 is substantially equal to D1 in the embodiment.

Corresponding to another outer diameter of the shield wire 1, the shield stopper 3 and the metal shell 4 each need to have a modified diameter. In that case, the first and second cutters 11,13 need to have modified dimensions.

What is claimed is:

1. An apparatus for finishing a stripped end of a shield wire (1), the shield wire having sequentially an inner sheath (7), a knitted layer (2), and an outer sheath (5) preliminarily stripped by a predetermined length from an end of the shield wire to expose the knitted layer, the apparatus comprising:

a shield stopper (3) mated with the shield wire over the exposed knitted layer until the shield stopper abuts against a stripped end of the outer sheath, a metal shell piece (4) preparatorily mated with the shield wire between the inner sheath and the knitted wire layer to expand the knitted wire layer, a clamp means (9) for clamping the shield stopper, a push means (19) for pushing the preparatorily mated metal shell piece to abut against the shield stopper, and a first cutter (11) and a second cutter (13) for shearing the exposed knitted layer while the first cutter moves along the gush means, wherein the push means is a pipe member (12) mated over the inner sheath and is movable relative to a support body (10) opposed to the clamp means, and wherein the first cutter is opposed to the clamp means and guides the pipe member to move relative to the support body, and the second cutter is mounted on the pair of clamp blocks opposed to the first cutter.

2. The apparatus as claimed in claim 1, wherein the first cutter has a cross sectional area gradually decreasing toward the clamp means.

3. The apparatus as claimed in claim 1, wherein the support body is movable relative to the clamp means.

4. The apparatus as claimed in claim 1, wherein the first cutter mounted on the support body is guided by the pipe member while the pipe member pushes the metal shell toward the shield stopper, so that the first cutter moves to engage with an outer periphery of the second cutter to thereby cut the knitted layer.

5. The apparatus as claimed in claim 1, wherein the metal shell is inserted into the shield stopper with the knitted layer therebetween.

6. The apparatus as claimed in claim 5, wherein the shield stopper crimps the metal shell and the knitted layer by the insertion of the metal shell into the shield stopper.

\* \* \* \* \*